US008228380B2

(12) United States Patent
Hardee et al.

(10) Patent No.: US 8,228,380 B2
(45) Date of Patent: Jul. 24, 2012

(54) INFORMING A DRIVER OR AN OWNER OF A VEHICLE OF VISIBLE PROBLEMS DETECTED BY OUTSIDE VIDEO SOURCES

(75) Inventors: Christopher James Hardee, Raleigh, NC (US); Donna Casteel Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 1166 days.

(21) Appl. No.: 12/049,328

(22) Filed: Mar. 15, 2008

(65) Prior Publication Data

US 2009/0231429 A1 Sep. 17, 2009

(51) Int. Cl.
*H04N 7/18* (2006.01)

(52) U.S. Cl. .......................................... 348/148; 348/143

(58) Field of Classification Search .................. 348/148, 348/143

See application file for complete search history.

(56) References Cited

U.S. PATENT DOCUMENTS 6,163,250 A 12/2000 Moskowitz ................ 340/425.5
6,570,608 B1 * 5/2003 Tserng .......................... 348/143
7,123,166 B1 * 10/2006 Haynes et al. ............. 340/932.2
7,688,225 B1 * 3/2010 Haynes et al. ............. 340/932.2
2002/0049663 A1 * 4/2002 Kahana ........................... 705/37
2002/0140577 A1 * 10/2002 Kavner ......................... 340/933
2004/0068433 A1 * 4/2004 Chatterjee et al. .............. 705/13
2004/0199785 A1 * 10/2004 Pederson ...................... 713/200
2004/0223054 A1 * 11/2004 Rotholtz ....................... 348/143
2005/0270373 A1 * 12/2005 Trela ............................. 348/143
2008/0150683 A1 * 6/2008 Mikan et al. ................. 340/5.31
2008/0183535 A1 * 7/2008 Kahana ............................. 705/7
2008/0239078 A1 * 10/2008 Mohr et al. ................... 348/148
2008/0252444 A1 * 10/2008 Batot et al. ............... 340/539.13

OTHER PUBLICATIONS

Specification to U.S. Appl. No. 60/921,394.*

* cited by examiner

*Primary Examiner* — John Follansbee
*Assistant Examiner* — Anthony Mejia
(74) *Attorney, Agent, or Firm* — Robert A. Voigt, Jr.; Winstead, P.C.

(57) ABSTRACT

A method, system and computer program product for informing a driver or an owner of a vehicle of visible problems detected by outside video sources. An on-board vehicle subsystem may receive a video image of a section of the vehicle (e.g., tail light of vehicle) from an outside video source (e.g., another vehicle, parking lot surveillance system). The received video image may be compared with stored video patterns of various sections of the vehicle. The on-board vehicle subsystem may identify a stored video pattern that substantially matches the received video image. The driver of the vehicle may be alerted to a problem (e.g., broken tail light) if the differences between the identified stored video pattern and the received video image amount to a problem.

13 Claims, 6 Drawing Sheets

INFORMING A DRIVER OR AN OWNER OF A VEHICLE OF VISIBLE PROBLEMS DETECTED BY OUTSIDE VIDEO SOURCES

TECHNICAL FIELD

The present invention relates to safety systems, and more particularly to informing drivers or owners of vehicles of visible problems (e.g., busted tail light) detected by outside video sources (e.g., video camera from another vehicle, parking lot camera).

BACKGROUND OF THE INVENTION

Oftentimes in today's busy world, we tend to be in a rush and not be aware of visible problems (e.g., a busted tail light, the gas tank being left open, the muffler becoming detached from the undercarriage, bag of groceries falling out) to our vehicles. Becoming aware of these problems is important as some of these problems may result in exposure to tickets, future repair costs if the problem is not attended to, loss of merchandise, etc. Hence, it is imperative that drivers or owners of vehicles be informed of visible problems to their vehicles as quickly as possible.

BRIEF SUMMARY OF THE INVENTION

In one embodiment of the present invention, a method for informing a driver of a vehicle of visible problems detected by outside video sources, the method comprising comparing a captured video image of a section of a vehicle to stored video patterns. The method further comprises identifying a stored video pattern that substantially matches the captured video image. Furthermore, the method comprises alerting a driver of the vehicle if differences between the identified stored video pattern and the captured video image amount to a problem.

In another embodiment of the present invention, a method for informing an owner of a vehicle of visible problems detected by outside video sources, the method comprising capturing a video image of a section of a vehicle. The method further comprises comparing the captured video image of the section of the vehicle to stored video patterns. Additionally, the method comprises identifying a stored video pattern that substantially matches the captured video image. Furthermore, the method comprises capturing an image of a license plate of an owner of the vehicle if differences between the identified stored video pattern and the captured video image amount to a problem.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

The present invention comprises a method, system and computer program product for informing a driver or an owner of a vehicle of visible problems detected by outside video sources. In one embodiment of the present invention, an on-board vehicle subsystem may receive a video image of a section of the vehicle (e.g., tail light of vehicle) from an outside video source (e.g., another vehicle, parking lot surveillance system). The received video image may be compared with stored video patterns of various sections of the vehicle. The on-board vehicle subsystem may identify a stored video pattern that substantially matches the received video image. The driver of the vehicle may be alerted to a problem (e.g., broken tail light) if the differences between the identified stored video pattern and the received video image amount to a problem.

While the following discusses the present invention in connection with outside video sources being a vehicle or a parking lot surveillance system, the principles of the present invention may be implemented in connection with using any outside video source with the capability of capturing a video image of one or more sections of the vehicle. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

As discussed in the Background section, oftentimes in today's busy world, we tend to be in a rush and not be aware of visible problems (e.g., a busted tail light, the gas tank being left open, the muffler becoming detached from the undercarriage, bag of groceries falling out) to our vehicles. Becoming aware of these problems is important as some of these problems may result in exposure to tickets, future repair costs if the problem is not attended to, loss of merchandise, etc.

Hence, it is imperative that drivers or owners of vehicles be informed of visible problems to their vehicles as quickly as possible.

Figure 1:
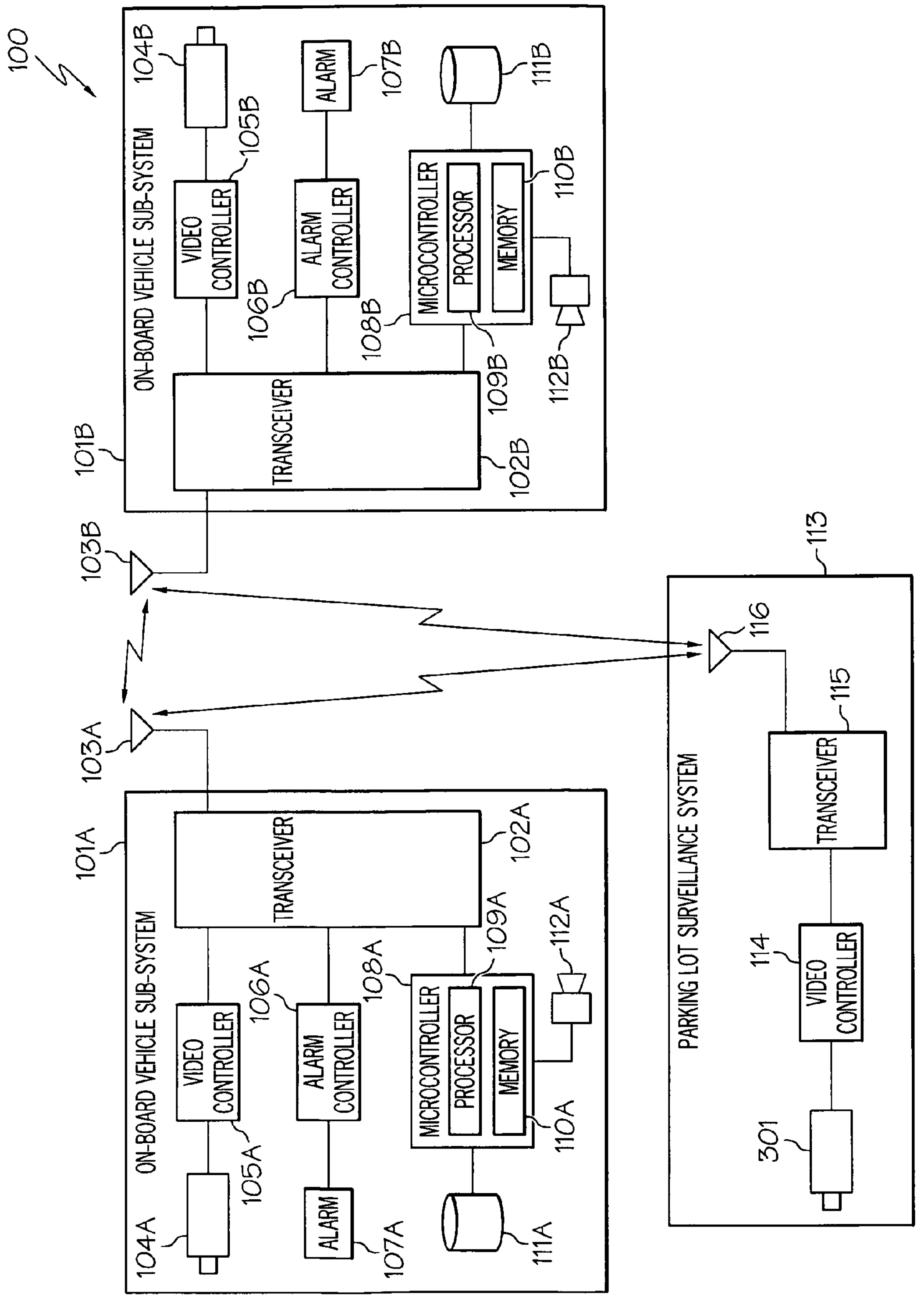
FIG. 1 illustrates a communication system for informing a driver or an owner of a vehicle of visible problems detected by outside video sources in accordance with an embodiment of the present invention.
Figure 2:
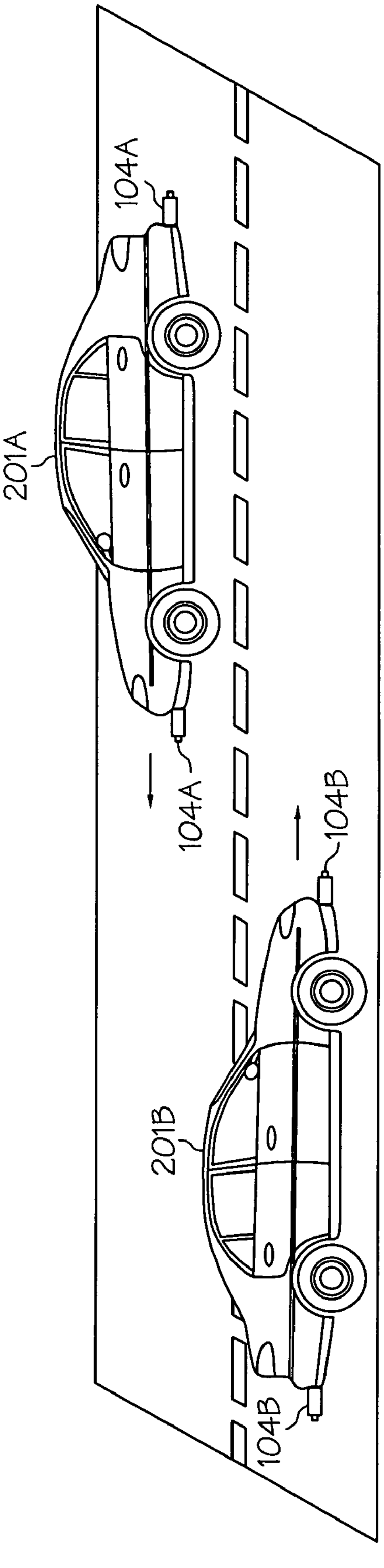
FIG. 2 illustrates the outside video source being another vehicle in accordance with an embodiment of the present invention.
Figure 3:
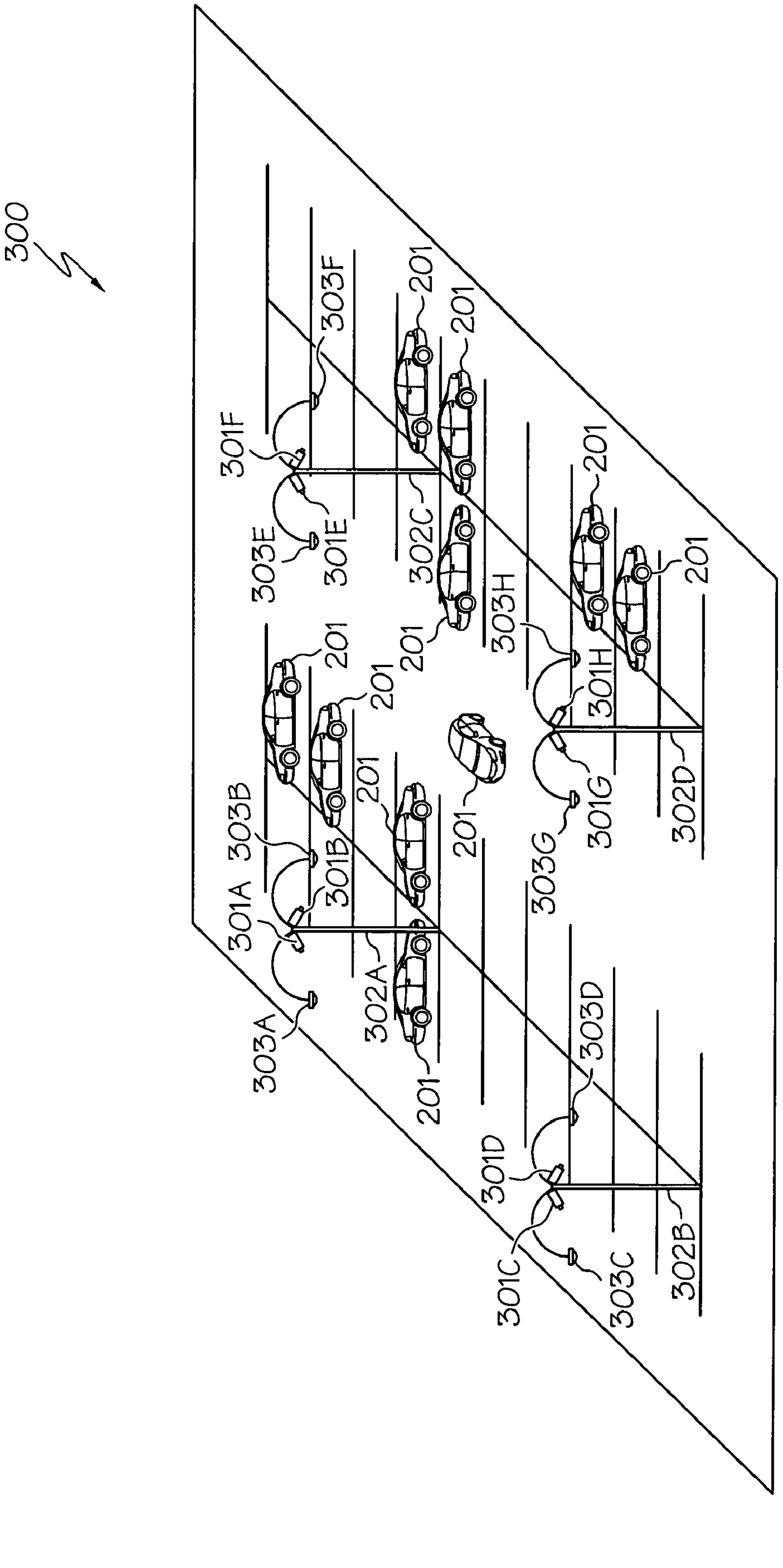
FIG. 3 illustrates the outside video source being a parking lot surveillance system in accordance with an embodiment of the present invention.
Figure 4:
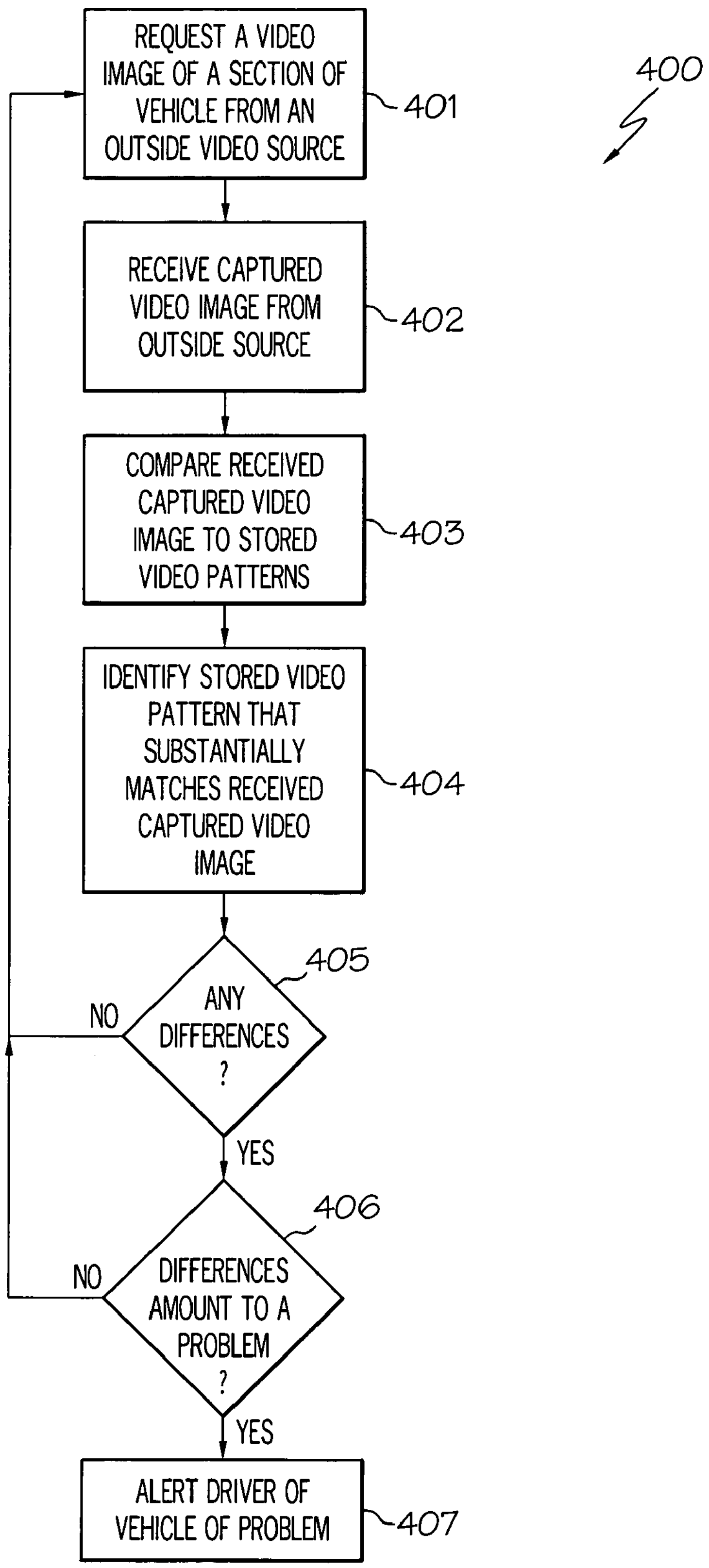
FIG. 4 is a flowchart of a method for informing a driver of a vehicle of visible problems detected by outside video sources in accordance with an embodiment of the present invention.
Figure 5:
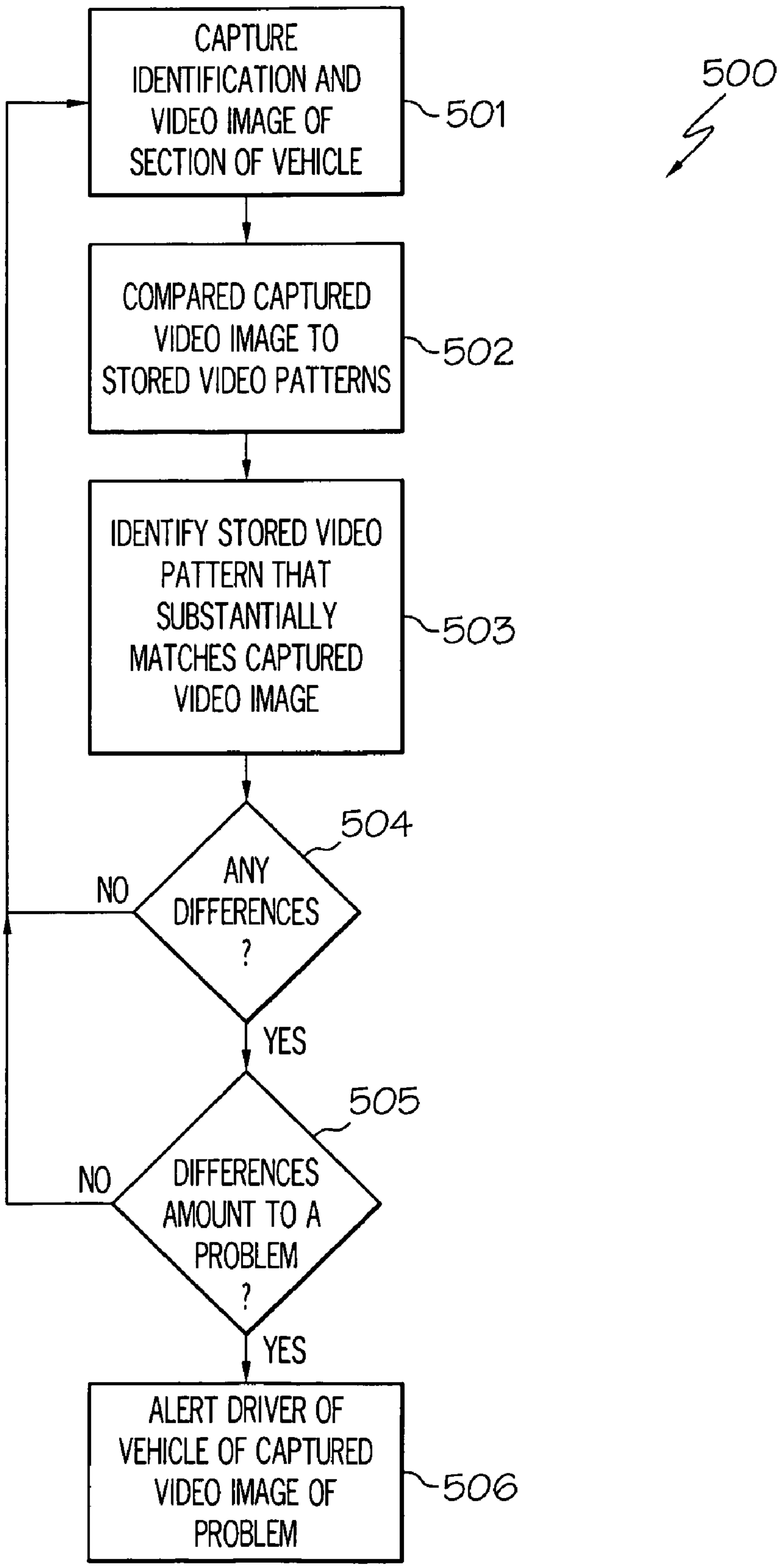
FIG. 5 is a flowchart of an alternative method for informing a driver of a vehicle of visible problems detected by outside video sources in accordance with an embodiment of the present invention.
Figure 6:
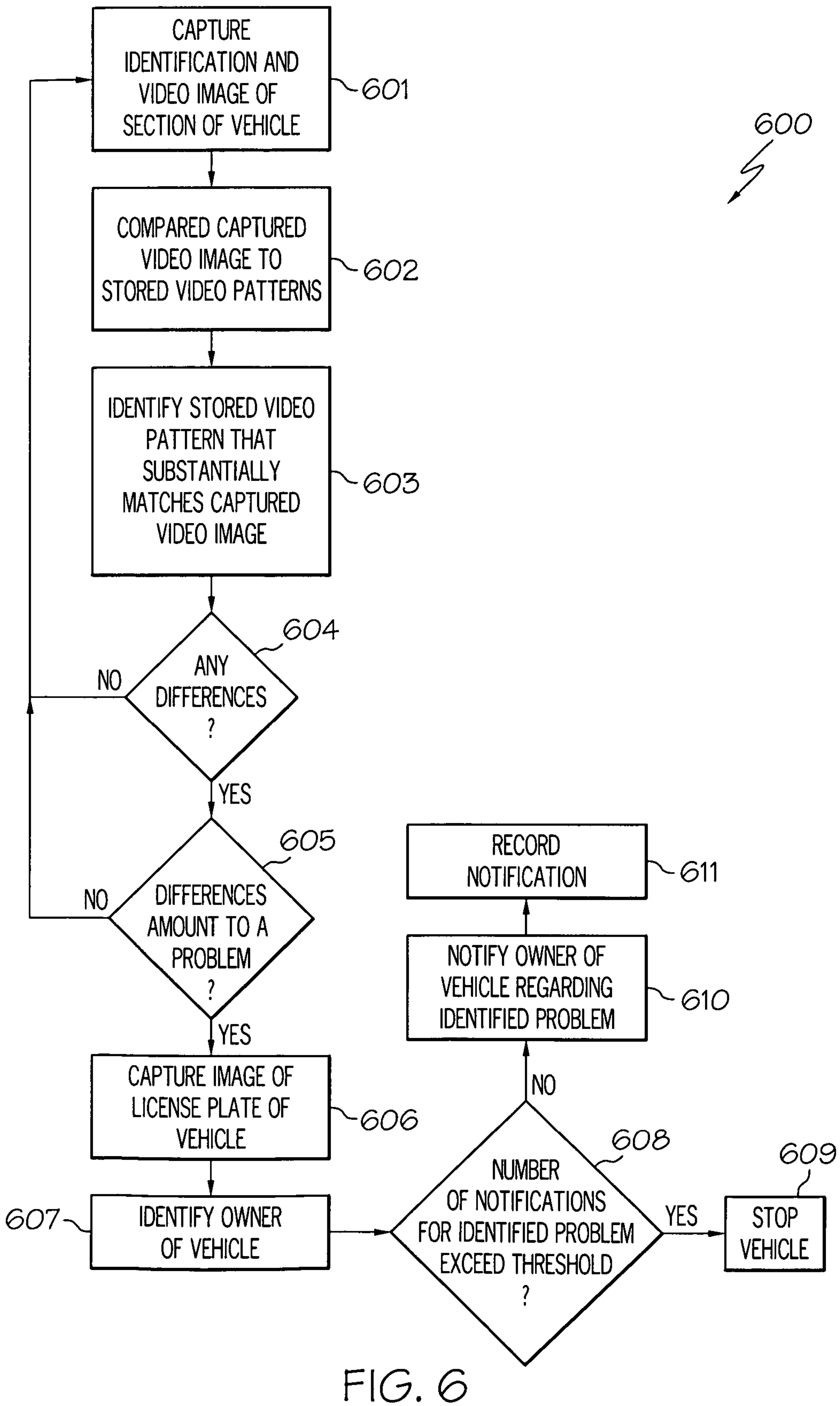
FIG. 6 is a flowchart of a method for informing an owner of a vehicle of visible problems detected by outside video sources operated by law enforcement personnel in accordance with an embodiment of the present invention.

Drivers or owners of vehicles may be informed of visible problems to their vehicles in a manner as discussed below in connection with FIGS. 1-6. FIG. 1 illustrates a communication system whereby a driver or owner of a vehicle is informed of visible problems to the vehicle using outside video sources, such as from another vehicle or from a parking lot surveillance system. FIG. 1 is discussed in conjunction with FIGS. 2-3 for ease of understanding. FIG. 2 illustrates the outside video source being another vehicle. FIG. 3 illustrates the outside video source being a parking lot surveillance system. FIG. 4 is a flowchart of a method for informing a driver of a vehicle of visible problems detected by outside video sources. FIG. 5 is a flowchart of an alternative method for informing a driver of a vehicle of visible problems detected by outside video sources. FIG. 6 is a flowchart of a method for notifying an owner of a vehicle of visible problems detected by outside video sources operated by law enforcement personnel.

FIGS. 1-3—Communication System for Informing a Driver or an Owner of a Vehicle of Visible Problems Detected by Outside Video Sources FIG. 1 illustrates a block diagram of a communication system 100 for informing a driver or an owner of a vehicle of visible problems detected by outside video sources in accordance with an embodiment of the present invention. FIG. 2 illustrates the outside video source being another vehicle in accordance with an embodiment of the present invention. FIG. 3 illustrates the outside video source being a parking lot surveillance system in accordance with an embodiment of the present invention.

A driver of a vehicle may be informed of a visible problem to the vehicle based on images captured by an outside source, such as another vehicle. Referring to FIG. 1, in conjunction with FIGS. 2-3, vehicles may include an on-board vehicle sub-system 101A-B. For example, referring to FIG. 2, vehicle 201A may include on-board vehicle sub-system 101A and vehicle 201B may include on-board vehicle sub-system 101B. Vehicles 201A-B may collectively be referred to as vehicles 201 or vehicle 201. Further, on-board vehicle sub-system 101A-B may collectively be referred to as on-board vehicle sub-systems 101 or on-board vehicle sub-system 101.

Returning to FIG. 1, on-board vehicle system 101A may include a transceiver 102A connected to an antenna 103A. Transceiver 102A is adapted to both transmit and received signals of information via antenna 103A. Both transceivers and vehicle-mounted antennas are well known to those skilled in the art and will not be discussed in detail for the sake of brevity.

On-board vehicle system 101A may further include one or more video input devices 104A, such as a video camera, mounted in or on a vehicle 201A, as illustrated in FIG. 2. While FIG. 2 illustrates video input devices 104A mounted in the front and back of vehicle 201A, it is noted that video input devices 104A may be mounted in or on vehicle 201A in any place and in any manner. It is further recognized that the present invention is not limited to any number of video input devices 104A.

Returning to FIG. 1, on-board vehicle sub-system 101A may further include a video controller 105A coupled to video input device 104A and transceiver 102A. Video controller 105A provides any and all necessary support functions to prepare a video signal from video input device 104A to be transmitted to another vehicle 201 (e.g., vehicle 201B via antenna 103B) via transceiver 102A and antenna 103A or to be analyzed by microcontroller 108A as discussed further below. Suitable video controllers 105A are known to those of skill in the art and are not further described herein for the sake of brevity.

On-board vehicle sub-system 101A may further include an alarm controller 106A coupled to an alarm 107A. Alarm 107A may refer to sensors, lights, alarms, or any other device or apparatus that provides a wanting or indication to the driver of vehicle 201 that a visible problem to the vehicle has been detected. Alarm controller 106A may be configured to trigger alarm 107A to provide such warning or indication based on receiving a signal to trigger alarm 107A from microcontroller 108A (discussed further below).

Additionally, on-board vehicle sub-system 101A may include microcontroller 108A that includes a processor 109A and a memory 110A. Microcontroller 108A may be configured to control the devices of on-board vehicle sub-system as discussed herein. Processor 109A may be configured to execute the instructions of the program stored in memory 110A. In one embodiment, the program for informing a driver of a vehicle of visible problems to the vehicle detected by outside video sources, as discussed further below in connection with FIGS. 4-5, may reside in memory 110A. Further, memory 110A may include a program for notifying the owner of a vehicle of visible problems of the vehicle detected by outside video sources operated by law enforcement personnel, as discussed further below in connection with FIG. 6.

On-board vehicle sub-system 101A may further include a storage unit 111A coupled to microcontroller 108A, where storage unit 111A may be configured to store video patterns of various sections of vehicle 201 as well as configured to store video patterns of various sections of other different vehicle makes and models. Further, on-board vehicle sub-system 101A may include a speaker 112A coupled to microcontroller 108A, where speaker 112A may be configured to announce to the driver of vehicle 201 that a visible problem to vehicle 201 has been detected.

On-board sub-system 101B is configured substantially the same as on-board sub-system 101A. Hence, while the foregoing has discussed in particularity the components of on-board sub-system 101A for vehicle 201A, the description of those components apply equally to the corresponding components (those components with the same element number but with a "B" appended to the element number) of on-board sub-system 101B for vehicle 201B. For example, transceiver 102B corresponds to transceiver 102A and so forth. When these components are collectively referred to herein, they are discussed in its plural form along with the element number but without any alphabetic letter extension. For example, input video devices 104A and 104B may collectively be referred to as input video devices 104. Further, when these components are individually referred to herein, they are discussed in its singular form along with the element number but without any alphabetic letter extension. For example, video input devices 104A and 104B may individually be referred to as video input device 104.

Referring to FIG. 2, vehicle 201A is traveling westward on a road and vehicle 201B is traveling eastward on the road. Each vehicle 201 may be configured with a video input device 104 that captures an image of a section of another vehicle. For example, video input device 104A of vehicle 201A may capture an image of a section of vehicle 201B. In another example, video input device 104B of vehicle 201B may capture an image of a section of vehicle 201A. The captured video image of the section of the other vehicle may be either transmitted to that vehicle for processing to determine if there is a visible problem with the vehicle, or, alternatively, may be internally processed to determine if there is a visible problem with the vehicle as discussed further below in connection with FIGS. 4-5, respectively. In one embodiment, vehicle 201 may, in addition to capturing a video image of a section of the other vehicle, capture an identification of that vehicle. For instance, each vehicle 201 may transmit an identification which allows the other vehicle 201 to associate the captured image with that vehicle. The identification may include information that allows the other vehicle 201 to send the captured video image or an alert signifying a visible problem with the vehicle to the appropriate vehicle 201.

In addition to having another vehicle being an outside video source, the outside video source may also be a parking lot surveillance system as illustrated in FIG. 3. Referring to FIG. 3, FIG. 3 illustrates a parking lot 300, which can have one or more video input devices 301A-H, such as a video camera, aimed thereupon. Video input devices 301A-H may collectively or individually be referred to as video input devices 301 or video input device 301, respectively.

Parking lot 300 can include any well-known area and/or structure designated for the parking of vehicles 201, such as, for example, a parking garage, an outdoor parking area, and/or a moving parking structure, such as an automobile transport.

Each video input device 301 can be mounted, for example, on a pole 302A-D upon which parking lot lights 303A-H are mounted. For example, parking lot lights 303A-B are mounted on pole 302A. Parking lot lights 303C-D are mounted on pole 302B. Further, parking lot lights 303E-F are mounted on pole 302C. Additionally, parking lot lights 303G-H are mounted on pole 302D. Poles 302A-D may collectively or individually be referred to as poles 302 or pole 302, respectively. Further, parking lot lights 303A-H may collectively or individually be referred to as parking lot lights 303 or parking lot light 303, respectively.

It is recognized that parking lot 300 may include any number of video input devices 301, poles 302 and parking lot lights 303 and that FIG. 3 is not limited in scope to any one particular embodiment.

Referring to FIG. 3, video input device 301 may be configured to capture an image of a section of a vehicle either parking or moving in parking lot 300. This image may be transmitted by a parking lot surveillance system (not shown in FIG. 3) to on-board vehicle sub-system 101 as discussed below in connection with FIG. 1. It is recognized that the parking lot surveillance system may be located on the grounds of parking lot 300 or located remote from parking lot 300.

Returning to FIG. 1, in connection with FIGS. 2 and 3, communication system 100 may include a parking lot surveillance system 113, which as discussed above, may be located on the grounds of parking lot 300 or located remote from parking lot 300. Parking lot surveillance system 113 may include one or more video input devices 301 connected to one or more video controllers 114 which are connected to transceiver 115. Transceiver 115 is adapted to both transmit and received signals of information via an antenna 116 connected to transceiver 115. Both transceivers and antennas are well known to those skilled in the art and will not be discussed in detail for the sake of brevity. Further, video controller 114 provides any and all necessary support functions to prepare a video signal from video input device 301 to be transmitted to another vehicle 201 via transceiver 115 and antenna 116 as discussed further below. Suitable video controllers 114 are known to those of skill in the art and are not further described herein for the sake of brevity.

It is recognized that parking lot surveillance system 113 may include any number of video input devices 301 and video controllers 114. It is further recognized that communication system 100 of FIG. 1 may include any number of on-board vehicle sub-systems 101 communicating amongst each other and with parking lot surveillance system 300 and that on-board vehicle sub-system 101 may include other elements that were not depicted for ease of understanding. FIG. 1 is not to be limited in scope to any one particular embodiment.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Drivers or owners of vehicles may be informed of visible problems to their vehicles using the methods disclosed below.

A method for informing a driver of a vehicle of visible problems detected by outside video sources is discussed below in connection with FIG. 4.

FIG. 4—Method for Informing a Driver of a Vehicle of Visible Problems Detected by Outside Video Sources FIG. 4 is a flowchart of a method 400 for informing a driver of a vehicle of visible problems detected by outside video sources in accordance with an embodiment of the present invention.

Referring to FIG. 4, in conjunction with FIGS. 1-3, in step 401, microcontroller 108 requests a video image of a section of vehicle 201 from an outside video source (e.g., video input device 104 on a nearby vehicle 201, video input device 301 mounted on pole 302). For example, video input device 104 on a nearby vehicle 201 (e.g., vehicle 201B) or video input device 301 captures a video image of a section of vehicle 201 (e.g., vehicle 201A). In one embodiment, microcontroller 108 sends its request to a transceiver to receive this captured video image. For example, microcontroller 108A sends a request to transceiver 102B and/or to transceiver 115 for a video image captured by video input device 104B and video input device 301, respectively.

In step 402, microcontroller 108 receives the captured video image of a section of vehicle 201. For example, if video input device 301 captured a video image of a section of vehicle 201, then, upon receiving a request from microcontroller 108, transceiver 115 may send the captured video image to microcontroller 108. In one embodiment, microcontroller 108, in its request, may include an identification that is used by transceiver 102, 115, receiving the request, to send the captured video image to the appropriate microcontroller 108.

In step 403, microcontroller 108 compares the received captured video image of the section of vehicle 201 to video patterns of various sections of vehicle 201 stored in storage unit 111. For example, microcontroller 108 may receive a video image of the tail light of vehicle 201 that shows the tail light of vehicle 201 being busted. Video patterns of various sections of vehicle 201, such as the tail light, may be stored in storage unit 111. Microcontroller 108 may compare the received image of the broken tail light with all the stored video patterns to determine if there are any video images that substantially matches the received captured video image. “Substantially,” as used herein, may refer “to a large extent” where a video image of a section of vehicle 201 showing damage (e.g., busted tail light), the gas tank being left open, an item falling out of the car, a car part (e.g., muffler) becoming detached, etc., is able to be matched with the video image of that section of vehicle 201 without the problem (e.g., a tail light not broken).

In step 404, microcontroller 108 identifies the stored video pattern that substantially matches the received captured video image. For example, if the captured video image was of a broken tail light, then microcontroller 108 may identify the stored video pattern of a tail light that is not broken.

In step 405, microcontroller 108 determines if there any differences between the captured video image and the stored video pattern that substantially matches the captured video image.

If there are no differences, then microcontroller 108 requests another video image of a section of vehicle 201 from an outside video source in step 401.

If, however, there are differences, then, in step 406, microcontroller 108 determines if the differences amount to a problem, A “problem,” as used herein, may refer to something visibly detected (e.g., gas tank open) at a section of the vehicle that the driver of the vehicle would like to be made aware of. For example, a scratch on a tail light would not amount to a problem; whereas, a broken tail light would amount to a problem.

If the differences do not amount to a problem, then microcontroller 108 requests another video image of a section of vehicle 201 from an outside video source in step 401.

If, however, the differences do amount to a problem, then, in step 407, microcontroller 108 alerts the driver of vehicle 201 of the detected problem. The driver of vehicle 201 may be alerted by several means, such as via an announcement through speaker 112 or the triggering of an alarm 107.

Method 400 may include other and/or additional steps that, for clarity, are not depicted. Further, method 400 may be executed in a different order presented and that the order presented in the discussion of FIG. 4 is illustrative. Additionally, certain steps in method 400 may be executed in a substantially simultaneous manner or may be omitted.

A discussion of an alternative method for informing a driver of a vehicle of visible problems detected by outside video sources is provided below in connection with FIG. 5.

FIG. 5—Alternative Method for Informing a Driver of a Vehicle of Visible Problems Detected by Outside Video Sources FIG. 5 is a flowchart of an alternative method 500 for informing a driver of a vehicle of visible problems detected by outside video sources in accordance with an embodiment of the present invention.

Referring to FIG. 5, in conjunction with FIGS. 1-3, in step 501, microcontroller 108 (e.g., microcontroller 108A) captures a video image of a section of another vehicle 201 (e.g., vehicle 201B) as well as an identification of that vehicle 201 (e.g., vehicle 201B). As stated above, each vehicle 201 may transmit an identification which allows the other vehicle 201 to associate the captured image with that vehicle.

In step 502, microcontroller 108 compares the captured video image of the section of vehicle 201 to video patterns of various sections of vehicle 201 stored in storage unit 111. In one embodiment, storage unit 111 may contains video patterns of various sections of different makes and models of vehicles. For example, storage unit 111 may contain video patterns of tail lights for a Ford™ Mustang™, a Ford™ F-150™, a Honda™ Acura™ and so forth. Microcontroller 108 may compare the captured video image with these video patterns to find the video pattern that substantially matches the captured video image.

In step 503, microcontroller 108 identifies the stored video pattern that substantially matches the received captured video image. For example, if the captured video image was of a broken tail light, then microcontroller 108 may identify the stored video pattern of a tail light that is not broken.

In step 504, microcontroller 108 determines if there any differences between the captured video image and the stored video pattern that substantially matches the captured video image.

If there are no differences, then microcontroller 108 captures another video image of a section of vehicle 201 as well as an identification of that vehicle 201 in step 501.

If, however, there are differences, then, in step 505, microcontroller 108 determines if the differences amount to a problem.

If the differences do not amount to a problem, then microcontroller 108 captures another video image of a section of vehicle 201 as well as an identification of that vehicle 201 in step 501.

If, however, the differences do amount to a problem, then, in step 506, microcontroller 108 alerts the driver of vehicle 201 of the detected problem. The driver of vehicle 201 is alerted of the detected problem based on the captured identification in step 501. The identification may include information that allows microcontroller 108 (e.g., microcontroller 108A) to send an alert to the appropriate vehicle 201 (e.g., vehicle 201B). In one embodiment, the alert is received by microcontroller 108 (e.g., microcontroller 108B via transceiver 102B and antenna 103B) which may then cause an announcement to be made via speaker 112 or trigger an appropriate alarm 107 to inform the driver that a problem has been detected.

Method 500 may include other and/or additional steps that, for clarity, are not depicted. Further, method 500 may be executed in a different order presented and that the order presented in the discussion of FIG. 5 is illustrative. Additionally, certain steps in method 500 may be executed in a substantially simultaneous manner or may be omitted.

A discussion of a method for informing an owner of a vehicle of visible problems detected by outside video sources operated by law enforcement personnel is provided below in connection with FIG. 6. In order to reduce the number of traffic stops related to minor infractions for having things that are visibly wrong with a vehicle (e.g., broken tail light, expired tags), the law enforcement agency may prefer notifying the owner of the vehicle of the visible problem to be corrected instead of stopping the driver of the vehicle as discussed below in connection with FIG. 6.

FIG. 6—Method for Informing an Owner of a Vehicle of Visible Problems Detected by Outside Video Sources Operated by Law Enforcement Personnel FIG. 6 is a flowchart of a method 600 for informing an owner of a vehicle of visible problems detected by outside video sources operated by law enforcement personnel in accordance with an embodiment of the present invention.

Referring to FIG. 6, in conjunction with FIGS. 1-3, in step 601, microcontroller 108 (e.g., microcontroller 108A) in a law enforcement vehicle 201 captures a video image of a section of another vehicle 201 (e.g., vehicle 201B) as well as an identification of that vehicle 201 (e.g., vehicle 201B). As stated above, each vehicle 201 may transmit an identification which allows the law enforcement vehicle 201 to associate the captured image with that vehicle.

In step 602, microcontroller 108 of the law enforcement vehicle 201 compares the captured video image of the section of vehicle 201 to video patterns of various sections of vehicle 201 stored in storage unit 111. In one embodiment, storage unit 111 may contains video patterns of various sections of different makes and models of vehicles. For example, storage unit 111 may contain video patterns of tail lights for a Ford™ Mustang™, a Ford™ F-150™, a Honda™ Acura™ and so forth. Microcontroller 108 of the law enforcement vehicle 201 may compare the captured video image with these video patterns to find the video pattern that substantially matches the captured video image.

In step 603, microcontroller 108 of the law enforcement vehicle 201 identifies the stored video pattern that substantially matches the received captured video image. For example, if the captured video image was of a broken tail light, then microcontroller 108 of the law enforcement vehicle 201 may identify the stored video pattern of a tail light that is not broken.

In step 604, microcontroller 108 of the law enforcement vehicle 201 determines if there any differences between the captured video image and the stored video pattern that substantially matches the captured video image.

If there are no differences, then microcontroller 108 of the law enforcement vehicle 201 captures another video image of a section of vehicle 201 as well as an identification of that vehicle 201 in step 601.

If, however, there are differences, then, in step 605, microcontroller 108 of the law enforcement vehicle 201 determines if the differences amount to a problem.

If the differences do not amount to a problem, then microcontroller 108 of the law enforcement vehicle 201 captures another video image of a section of vehicle 201 as well as an identification of that vehicle 201 in step 601.

If, however, the differences do amount to a problem, then, in step 606, microcontroller 108 of the law enforcement vehicle 201 captures an image of the license plate of vehicle 201 with the problem detected. In step 607, microcontroller 108 of the law enforcement vehicle 201 identifies the owner of vehicle 201 based on the captured license plate number of vehicle 201. For example, microcontroller 108 may be in communication with a computing system of a law enforcement agency that provides information about owners of vehicles based on license plate numbers.

In step 608, microcontroller 108 of the law enforcement vehicle 201 determines whether the number of notifications sent to the owner of vehicle 201 for the identified problem exceeds a threshold. For example, microcontroller 108 may be in communication with a computing system of a law enforcement agency that provides information about the number of notifications sent to the owner of the vehicle for particular problems (e.g., broken tail lights). Microcontroller 108 may determine if the received number of notifications exceeds a threshold (e.g., three letters sent within the past 6 months). In one embodiment, notifications may be sent to the owner of vehicle 201 in many different manners, such as via mail, electronic mall, phone, etc.

If the number of notifications sent to the owner of vehicle 201 for the identified problem exceeds a threshold, then, in step 609, the law enforcement personnel stops vehicle 201. That is, if the number of notifications sent to the owner of vehicle 201 for the identified problem exceeds a threshold, then, in step 609, the law enforcement personnel pulls-over vehicle 201 with the identified problem.

If, however, the number of notifications sent to the owner of vehicle 201 for the identified problem does not exceed a threshold, then, in step 610, microcontroller 108 of the law enforcement vehicle 201 notifies the owner of the vehicle regarding the identified problem. As stated above, the owner may be notified in many different manners, such as via mail, electronic mail and by phone.

In step 611, microcontroller 108 of the law enforcement vehicle 201 records the notification being sent to the owner of vehicle 201. Microcontroller 108 of the law enforcement vehicle 201 may record the notification being sent to the owner of vehicle 201 by transmitting a copy of the notification or an indication of sending such notification to a law enforcement agency. Microcontroller 108 of the law enforcement vehicle 201 may further send the identity of the owner, the license plate number of vehicle 201, the identified problem and other pertinent information to the law enforcement agency so that an accurate record can be maintained of the number of notifications sent to the owner of vehicle 201 for the identified problem.

Method 600 may include other and/or additional steps that, for clarity, are not depicted. Further, method 600 may be executed in a different order presented and that the order presented in the discussion of FIG. 6 is illustrative. Additionally, certain steps in method 600 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for informing a driver of a vehicle of visible problems detected by outside video sources, the method comprising:

comparing a captured video image of a section of a vehicle to stored video patterns;

identifying a stored video pattern that substantially matches said captured video image;

alerting a driver of said vehicle if differences between said identified stored video pattern and said captured video image amount to a problem; and requesting said captured video image from an outside source;

wherein said outside source comprises one of the following: another vehicle and a parking lot surveillance system.

2. The method as recited in claim 1, wherein said driver of said vehicle is alerted in one or more of the following manners: an alarm and an announcement through a speaker.

3. The method as recited in claim 1 further comprising:

capturing an identification of said vehicle along with said video image of said section of said vehicle, wherein said driver of said vehicle is alerted based on said captured identification of said vehicle.

4. A method for informing an owner of a vehicle of visible problems detected by outside video sources, the method comprising:

capturing a video image of a section of a vehicle;

comparing said captured video image of said section of said vehicle to stored video patterns;

identifying a stored video pattern that substantially matches said captured video image;

capturing an image of a license plate of an owner of said vehicle if differences between said identified stored video pattern and said captured video image amount to a problem; and notifying said owner of said vehicle of said problem based on information obtained from said license plate.

5. The method of claim 4 further comprising:

recording said notification to said owner of said vehicle.

6. The method as recited in claim 4, wherein said owner of said vehicle is notified in one or more of the following manners: mail, electronic mail, and phone.

7. The method of claim 4 further comprising:

stopping said vehicle if a number of notifications sent to said owner of said vehicle for said problem exceeds a threshold.

8. A system, comprising:

a memory unit for storing a computer program for informing a driver of a vehicle of visible problems detected by outside video sources; and a processor coupled to said memory unit, wherein said processor, responsive to said computer program, comprises:

circuitry for comparing a captured video image of a section of said vehicle to stored video patterns;

circuitry for identifying a stored video pattern that substantially matches said captured video image;

circuitry for alerting a driver of said vehicle if differences between said identified stored video pattern and said captured video image amount to a problem;

circuitry for requesting said captured video image from an outside source; and circuitry for receiving said captured video image from said outside source;

wherein said outside source comprises one of the following: another vehicle and a parking lot surveillance system.

9. The system as recited in claim 8, wherein said driver of said vehicle is alerted in one or more of the following manners: an alarm and an announcement through a speaker.

10. The system as recited in claim 8, wherein said processor further comprises:

circuitry for capturing an identification of said vehicle along with said video image of said section of said vehicle, wherein said driver of said vehicle is alerted based on said captured identification of said vehicle.

11. A computer program product embodied in a computer readable medium, wherein the medium does not include a propagating signal, for informing a driver of a vehicle of visible problems detected by outside video sources, the computer program product comprising the programming instructions for:

comparing a captured video image of a section of said vehicle to stored video patterns;

identifying a stored video pattern that substantially matches said captured video image;

alerting a driver of said vehicle if differences between said identified stored video pattern and said captured video image amount to a problem;

requesting said captured video image from an outside source; and receiving said captured video image from said outside source;

wherein said outside source comprises one of the following: another vehicle and a parking lot surveillance system.

12. The computer program product as recited in claim 11, wherein said driver of said vehicle is alerted in one or more of the following manners: an alarm and an announcement through a speaker.

13. The computer program product as recited in claim 11 further comprising the programming instructions for:

capturing an identification of said vehicle along with said video image of said section of said vehicle, wherein said driver of said vehicle is alerted based on said captured identification of said vehicle.

* * * * *